US012601097B2

(12) United States Patent
Cavacece et al.

(10) Patent No.: US 12,601,097 B2
(45) Date of Patent: Apr. 14, 2026

(54) SEALING DEVICE FOR SLEEVES OF WASHING MACHINES

(71) Applicant: AKTIEBOLAGET SKF, Gothenburg (SE)

(72) Inventors: Fabio Cavacece, Rome (IT); Fausto Baracca, Massa (IT); Andrea A. Bertolini, Carrara (IT); Fabio Falaschi, Carrara (IT)

(73) Assignee: AKTIEBOLAGET SKF (SE)

( * ) Notice: Subject to any disclaimer, the term of this patent is extended or adjusted under 35 U.S.C. 154(b) by 0 days.

(21) Appl. No.: 17/987,959

(22) Filed: Nov. 16, 2022

(65) Prior Publication Data

US 2023/0160128 A1 May 25, 2023

(30) Foreign Application Priority Data

Nov. 24, 2021 (IT) .......................... 102021000029618

(51) Int. Cl.
*F16J 15/32* (2016.01)
*D06F 37/26* (2006.01)
(Continued)

(52) U.S. Cl.
CPC .............. *D06F 37/26* (2013.01); *D06F 37/30* (2013.01); *D06F 37/42* (2013.01); *F16J 15/32* (2013.01)

(58) Field of Classification Search
CPC ........ F16J 15/32; F16J 15/447; F16J 15/4472; F16J 15/4474; F16J 15/4476; F16J 15/4478; D06F 37/26
See application file for complete search history.

(56) References Cited

U.S. PATENT DOCUMENTS 3,841,721 A * 10/1974 Coutant .................. F16C 35/06
384/546
4,199,154 A * 4/1980 Mueller .................... F16J 15/40
415/110
(Continued)

FOREIGN PATENT DOCUMENTS

EP 2837839 2/2015
EP 2857705 4/2015
(Continued)

OTHER PUBLICATIONS

Search Report for corresponding Italy Patent Application No. 102021000029618 dated Jun. 28, 2022.

*Primary Examiner* — Christine M Mills
*Assistant Examiner* — L. Susmitha Koneru
(74) *Attorney, Agent, or Firm* — Reed Smith LLP

(57) ABSTRACT

A sealing device for a sleeve of washing machines, provided internally with bearing units. The device is provided with a stationary first annular screen which integrally carries a first elastomeric element, a second annular rotating screen which integrally carries a second elastomeric element. The first and the second elastomeric elements face each other defining a first annular meatus (M), and a plurality of pairs of annular sealing lips (L1, L2) arranged inside the first annular meatus (M). The first sealing lip (L1) and the second sealing lip (L2) of the plurality of pairs of annular sealing lips (L1, L2) are substantially radially and axially superimposed and have predetermined axial dimensions to be radially and axially separated from each other and to define, inside the first annular meatus (M) and with the first and second sealing lips of the other pairs of annular sealing lips (L1, L2), a tortuous labyrinth (L).

20 Claims, 2 Drawing Sheets

(51) Int. Cl.
    *D06F 37/30*           (2020.01)
    *D06F 37/42*           (2006.01)

(56)                   References Cited

U.S. PATENT DOCUMENTS

| | | | | |
|---|---|---|---|---|
| 5,025,917 | A * | 6/1991 | Smith | F16C 13/022 |
| | | | | 384/480 |
| 5,074,408 | A * | 12/1991 | Smith | F16C 13/022 |
| | | | | 384/465 |
| 6,206,182 | B1 * | 3/2001 | Wilson | B65G 39/09 |
| | | | | 198/842 |
| 6,234,293 | B1 * | 5/2001 | Fasoli | F16C 13/022 |
| | | | | 193/37 |
| 6,287,014 | B1 * | 9/2001 | Salla | F16C 13/022 |
| | | | | 384/546 |
| 9,133,940 | B1 * | 9/2015 | Taylor | F16J 15/164 |
| 2006/0147141 | A1 * | 7/2006 | Harwood | F16J 15/4478 |
| | | | | 384/480 |
| 2011/0150380 | A1 * | 6/2011 | Walter | F16J 15/3264 |
| | | | | 384/484 |
| 2022/0325755 | A1 * | 10/2022 | Baracca | F16J 15/3276 |

FOREIGN PATENT DOCUMENTS

| | | | | | |
|---|---|---|---|---|---|
| EP | 3425224 | A1 | 1/2019 | | |
| JP | 2010185491 | A * | 8/2010 | ......... | F16C 33/7876 |
| KR | 20060008400 | | 1/2006 | | |

* cited by examiner

SEALING DEVICE FOR SLEEVES OF WASHING MACHINES

CROSS-REFERENCE TO RELATED APPLICATION

This application is based on and claims priority to Italian Patent Application No. 102021000029618 filed on Nov. 24, 2021, under 35 U.S.C. § 119, the disclosure of which is incorporated by reference herein.

FIELD

The present disclosure relates to a sealing device for sleeves of washing machines, which seals off the portion of the machine including the bearing units for supporting the rotary shaft from the portion of the machine dedicated to washing and including the washing tub of the washing machine.

BACKGROUND

The sleeves of washing machines may be interposed between the tub of the washing machine and a motor shaft for driving the drum of the washing machine.

The sleeves typically include a hub and a pair of rolling bearings, which are housed inside the hub and are engaged by the motor shaft, which projects out from the sleeve so as to support the drum.

BRIEF DESCRIPTION OF THE DRAWINGS

The disclosure will now be described with reference to the attached drawings, which show exemplary embodiments thereof, in which.

DETAILED DESCRIPTION

The sleeves of washing machines may be interposed between the tub, which may be made of plastic, of the washing machine and a motor shaft for driving the drum of the washing machine The sleeves are typically co-molded in the plastic material of the tub, and include a hub which may be made of metal and a pair of rolling bearings, which are housed inside the hub axially spaced apart from one another and are engaged by the motor shaft which projects out from the sleeve so as to support the drum.

On the side where the motor shaft projects axially from the sleeve, in order to protect the rolling bearings from water, detergents and other solid contaminants, such as sand, fibers and pebbles, a sealing device may be provided, which may have two support screens and two or three sealing lips mounted on a first screen of the two support screens and in sliding contact with the second screen of the two support screens. To increase the sealing action, one of these lips may be also equipped with a spring, which presses the relative lip radially against the sealing surface of the second screen.

Such sealing devices, although providing optimum sealing capacity, have rather large axial dimensions, which limit, in some cases, the usable space for the tub, in other words its volume, especially in cases where the related washing machines have to have small axial dimensions.

The sealing devices described above have optimum sealing capacity but may also give rise to relatively high friction forces to the detriment of the energy consumption of the washing machines.

One object of the present disclosure is to provide a sealing device for sleeves of washing machines, which makes it possible to optimize the space available for the tub even in washing machines with small axial dimensions.

Another object of the present disclosure is to provide a sealing device for sleeves of washing machines which, as well as having good sealing capacity, has low friction and offers savings in terms of consumption.

According to the present disclosure, the sealing device has an optimized shape for reducing axial size, which benefits tub capacity and internal friction.

Figure 1:
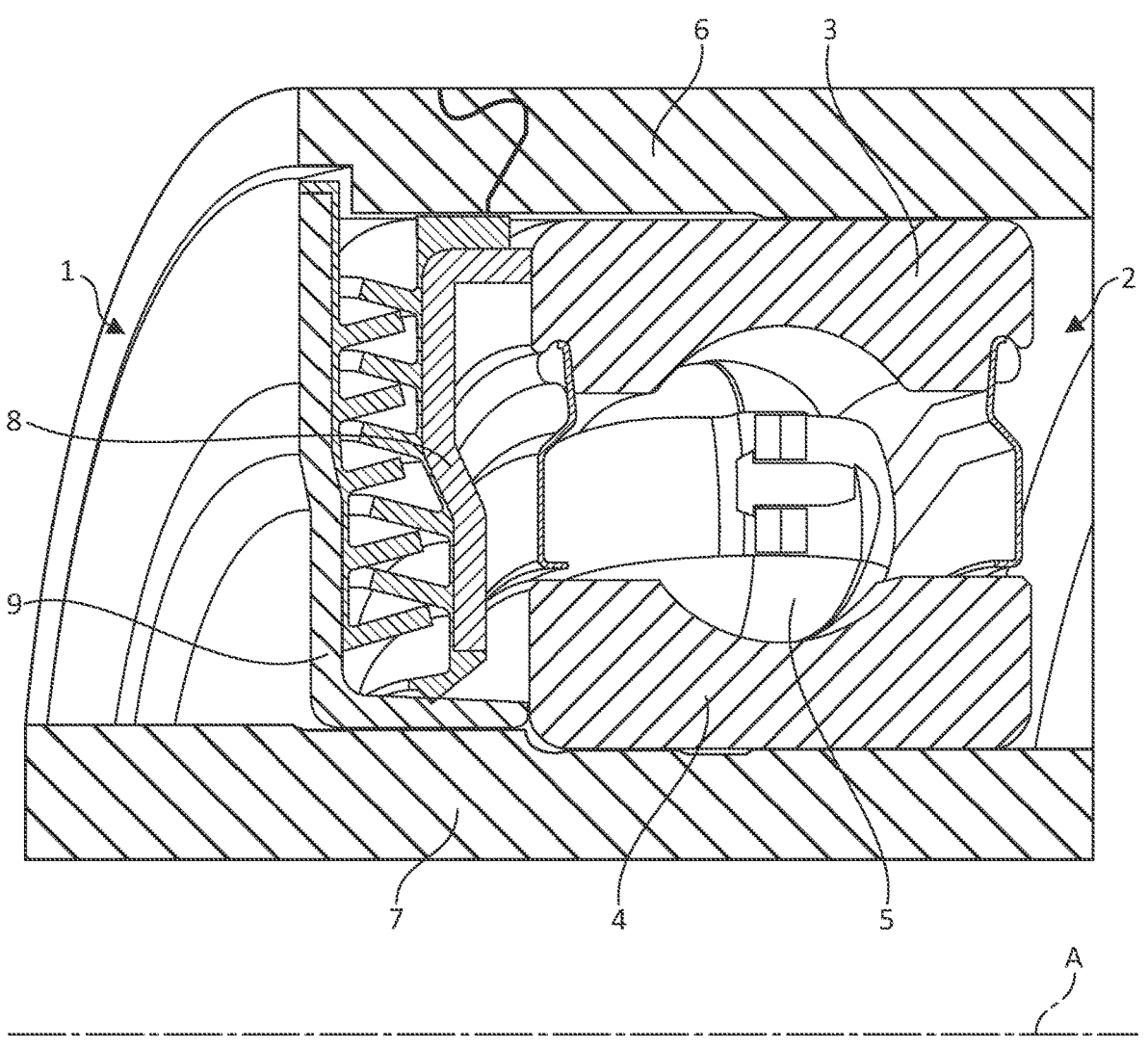
FIG. 1 is a cross-sectional view of the portion of the washing machine, which houses the sealing device according to exemplary embodiments of this disclosure.
Figure 2:
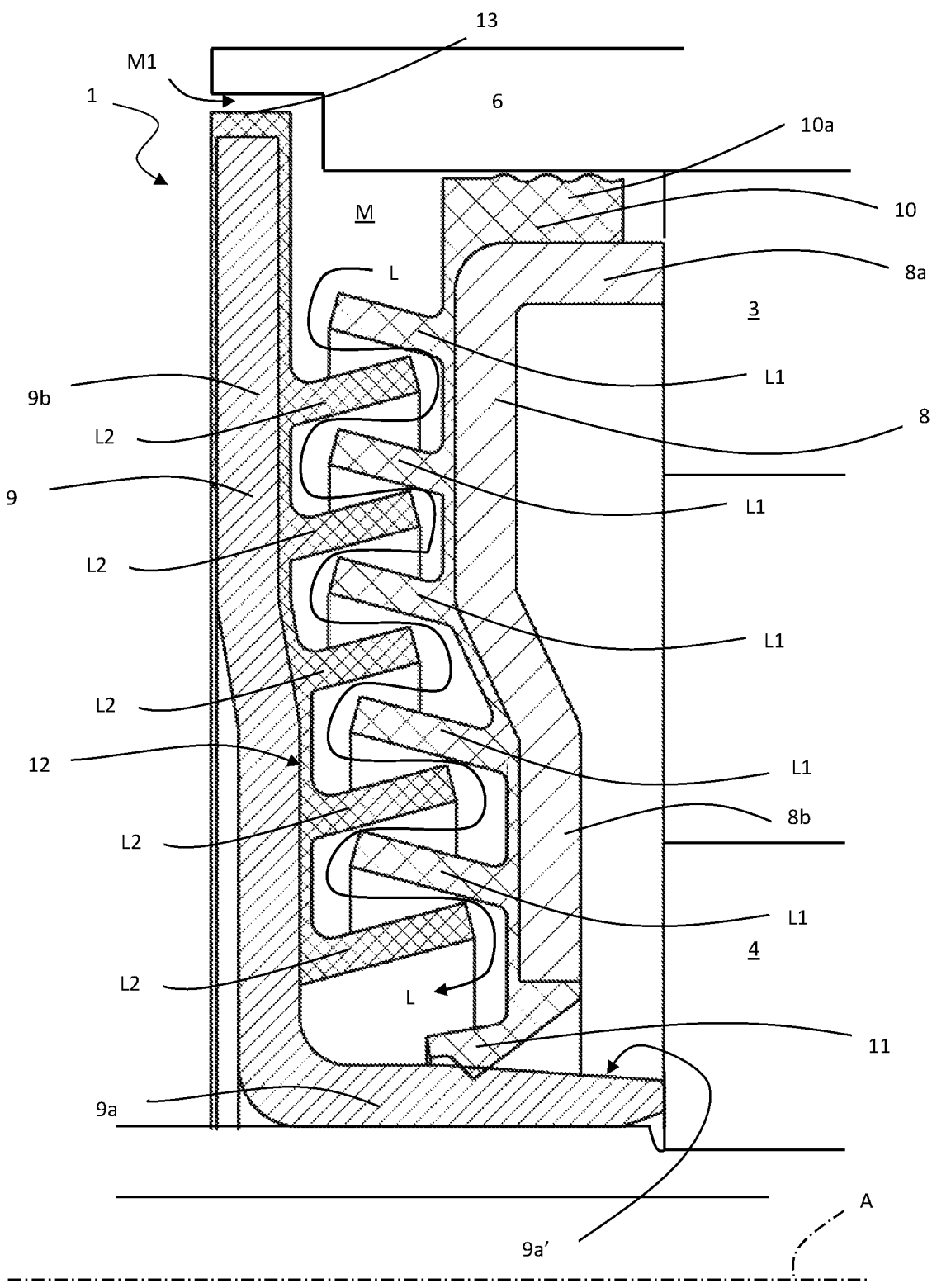
FIG. 2 is a radial cross-sectional view of a sealing device according to exemplary embodiments of this disclosure.

By way of non-limiting example and with reference to FIGS. 1-2, the sealing device for sleeves of washing machines is designated by the reference sign 1. In such machines, use may be made of two radial "deep groove" ball bearing units, and the sealing device may be mounted axially externally to the latter.

FIG. 1 shows the portion of the washing machine, which houses the sealing device 1. One bearing unit 2 of the pair of bearing units may include a radially outer ring 3, a radially inner ring 4 and a row of rolling bodies 5. A sleeve 6 may be provided which is stationary and integral with a washing tub of the washing machine. A motor shaft 7 may project out from the sleeve so as to support the drum of the washing machine. All of the above components are axisymmetric with respect to a central axis A.

Throughout the present description and in the claims, terms and expressions indicating positions and directions such as "radial", "axial" or "transverse" are intended with reference to the axis of symmetry A.

With reference to FIG. 2, the sealing device 1 may include a first annular stationary screen 8 configured to be connected in use to the sleeve 6, and a second annular rotating screen 9 facing the first annular stationary screen 8, and configured to be connected in use to the motor shaft 7. In various embodiments, first annular stationary screen 8 and second annular rotating screen 9 are made of sheet metal. First annular stationary screen 8 may have a first cylindrical mounting portion 8a and a first flange portion 8b. Second annular rotating screen 9 may have a second cylindrical mounting portion 9a and a second flange portion 9b.

The two cylindrical annular screens 8, 9 facing each other define a first annular meatus M of predetermined axial dimensions.

The sealing device 1 may further include a first elastomeric element 10 carried integrally by the first annular stationary screen 8 facing the second annular rotating screen 9. The first elastomeric element 10 may be provided with at least one annular sliding sealing lip 11 configured to cooperate in contact, in use, with the second cylindrical portion 9a of the second annular rotating screen 9.

Sealing device 1 may further include a second elastomeric element 12, carried integrally by the second annular rotating screen 9, facing the first annular stationary screen 8 and facing the first elastomeric element 10. The first annular meatus M may be defined between the first elastomeric element 10 and the second elastomeric element 12. The second elastomeric element 12 may further include a non-contacting distal radial portion 13, configured to cooperate in use with the sleeve 6 to form a second annular meatus M1 that is configured as a first barrier to the entry of washing liquids or other impurities. This second annular meatus M1, taking advantage of the geometrical boundary conditions of the washing machine, makes it possible to minimize the ingress of solid contaminants.

According to various embodiments, the first annular stationary screen 8 may be mounted externally with interference in the sleeve 6, by the interposition of a third cylindrical portion 10a of the first elastomeric element 10 between sleeve 6 and first annular stationary screen 8, and axially, by the first cylindrical portion 8a of the screen 8, against the radially outer ring 3. This arrangement does not require, for the attachment of the sealing device, any working either of the radially outer ring 3, for example, the production of an attachment groove, or of the sleeve 6.

Alternatively, according to various embodiments, the first cylindrical mounting portion 8a may be mounted with a free annular edge thereof facing the outside of the bearing unit 2 and directly defining the second annular meatus M1 with the non-contacting distal radial portion 13 of the second elastomeric element 12.

In various embodiments, the second annular rotating screen 9 may be mounted internally with interference on the motor shaft 7 and axially, by means of the second cylindrical portion 9a of the second annular rotating screen 9, against the radially inner ring 4.

In various embodiments, the first elastomeric element 10 and the second elastomeric element 12 may be provided with a plurality of pairs of annular sealing lips L1, L2 arranged inside the first annular meatus M. The first sealing lip L1 and the second sealing lip L2 of the plurality of pairs of annular sealing lips L1, L2 may be substantially radially and axially superimposed and have predetermined axial dimensions to define, inside the first annular meatus M and with the first and the second sealing lips of the other pairs of annular sealing lips L1, L2, a tortuous labyrinth L, configured to make it difficult for any washing liquids or other impurities to enter the sleeve 6, in other words the portion of the washing machine in which the bearing units 2 are housed.

The first and the second sealing lip of each pair of annular sealing lips L1, L2 may be radially and axially superimposed, but also radially and axially separate, in other words free of one another without any point of contact.

In various embodiments shown in FIG. 2, the first elastomeric element 10 and the second elastomeric element 12 may be respectively provided with an equal number N of annular sealing lips L1, L2, where the value of N, in order to obtain the required sealing efficiency, may be greater than three. Advantageously, as shown in FIG. 2, both the first elastomeric element 10 and the second elastomeric element 12 may each be provided with five annular sealing lips L1, L2, which are non-contacting.

Both the number and the axial dimensions of the annular sealing lips L1, L2 may be optimized in such a way as to make the tortuous labyrinth L as long as possible, compatibly with the dimensions of the meatus M, and as narrow as possible, at the same time avoiding the annular sealing lips L1, L2 coming into contact with one another and giving rise to friction losses.

In various embodiments, the second annular screen 9 may be designed such that the second cylindrical portion 9a, used for attachment, faces the radially inner ring 4. This also means that the annular sliding sealing lip 11 slides on the radially external surface 9a' of the second cylindrical portion 9a. There are primarily two advantages:

improved fitting of the sealing device, since the second cylindrical portion 9a comes into abutment against the lateral surface of the radially inner ring 4. Furthermore, the second cylindrical portion 9a has a radially external lateral surface 9a' of slightly truncated cone shape, thus preventing the annular sliding sealing lip 11 from being deformed during fitting.

axial size of the entire sealing device 1 reduced to a minimum.

In short, this sealing device makes it possible to obtain a number of advantages and achieve the aims set out by the present disclosure.

First of all, the reduction in friction losses and hence a significant saving on energy. Sealing performance is provided by the tortuous labyrinth and, therefore, is not correlated with the force of contact of the sliding lip with the benefit of the reduction in friction losses.

Second, this sealing device, which takes advantage of the concept of "guttering", in other words two facing screens very close to one another, enables a significant reduction in axial size, equal to less than half with respect to other known solutions. This maximizes the axial space available for the washing tub and therefore increases the load capacity of the drum of the washing machine.

Third, the optimization of the tortuous labyrinth, which may be made very long and very narrow by the number and dimensions of the pairs of sealing lips, makes it possible to take maximum advantage of the sealing offered by the "guttering" system and ensure excellent sealing performance. All of this is further provided by the geometry of the second elastomeric element comprising the non-contacting distal radial portion that forms with the sleeve the second annular meatus, and this meatus works as a first barrier to the entry of water and contaminants.

Lastly, the fitting of the sealing device is simplified, since it does not require further working of the other components, and may be made as abutment surfaces of the surfaces of the rings of the bearing unit.

Note that, in addition to the embodiments of the disclosure described above, many other variants exist. It must also be understood that these embodiments are simply examples and do not limit the scope of the disclosure or its applications or its possible configurations. On the contrary, although the description above makes it possible for a person skilled in the art to implement the present disclosure at least according to one exemplary embodiment thereof, it must be understood that many variations of the components described are possible without thereby exceeding the scope of the disclosure as defined in the attached claims, interpreted literally and/or according to their legal equivalents.

We claim:

1. A sealing device for a sleeve of a washing machine, the washing machine comprising a bearing unit, the sealing device comprising:

a first annular stationary screen comprising:

a first cylindrical mounting portion comprising an axially facing free annular edge; and a first flange portion;

a first elastomeric element supported by the first annular stationary screen, wherein the free annular edge is free from the first elastomeric element;

a second annular rotating screen facing the first annular stationary screen, the second annular rotating screen comprising:

a second cylindrical mounting portion; and a second flange portion;

a second elastomeric element supported by the second annular rotating screen, wherein the first elastomeric element and the second elastomeric element face each other and define a first annular meatus (M) of predetermined axial dimensions; and a plurality of pairs of annular sealing lips (L1, L2) arranged inside the first annular meatus (M), wherein a first sealing lip (L1) of each pair of annular sealing lips (L1, L2) is part of the first elastomeric element and is supported by the first annular stationary screen and a second sealing lip (L2) of each pair of annular sealing lips (L1, L2) is part of the second elastomeric element and is supported by the second annular rotating screen;

wherein the first sealing lip (L1) and the second sealing lip (L2) of the plurality of pairs of annular sealing lips (L1, L2) are substantially radially and axially superimposed and have predetermined axial dimensions to be radially and axially separated from each other and to define, inside the first annular meatus (M) and with the first and second sealing lips of the other pairs of annular sealing lips (L1, L2), a tortuous labyrinth (L), wherein the first annular stationary screen is configured to be non-contacting with the sleeve mounted externally with interference in the sleeve by the interposition of a third cylindrical portion of the first elastomeric element between the sleeve and the first cylindrical mounting portion of the first annular stationary screen.

2. The sealing device of claim 1, wherein the first elastomeric element and the second elastomeric element are respectively provided with an equal number (N) of annular sealing lips (L1, L2), and wherein the value of (N) is greater than three.

3. The sealing device of claim 2, wherein the number (N) of annular sealing lips (L1, L2) is five.

4. The sealing device of claim 1, wherein the second elastomeric element comprises a non-contacting distal radial portion configured to cooperate in use with the sleeve to form a second annular meatus (M1), and the second annular meatus (M1) is configured as a first barrier to entry of washing liquids or other impurities.

5. The sealing device of claim 1, wherein the free annular edge is configured to be mounted against a radially outer ring of the bearing unit when the sealing device is mounted to the bearing unit.

6. The sealing device of claim 1, wherein the free annular edge of the first cylindrical mounting portion is configured to face axially towards the outside of the bearing unit when the sealing device is mounted to the bearing unit, and the free annular edge is configured to cooperate in use with a non-contacting distal radial portion of the second elastomeric element to form a second annular meatus (M1), the second annular meatus (M1) is configured as a first barrier to the ingress of washing liquids or other impurities.

7. The sealing device of claim 1, wherein the second annular rotating screen is configured to be mounted internally with interference on a motor shaft of a washing machine and axially by the second cylindrical mounting portion against a radially inner ring of the bearing unit of the washing machine.

8. The sealing device of claim 7, wherein, the second cylindrical mounting portion of the second annular rotating screen is configured to face the radially inner ring of the bearing unit when the sealing device is mounted in the bearing unit, and the first elastomeric element further comprises an annular sliding sealing lip, wherein the annular sliding sealing lip cooperates in use with a radially external lateral surface of the second cylindrical mounting portion.

9. The sealing device of claim 7, wherein the radially external lateral surface comprises a slightly truncated cone shape.

10. The sealing device of claim 1, wherein, the first annular stationary screen comprises sheet metal, and the second annular rotating screen comprises sheet metal.

11. The sealing device of claim 1, wherein the second elastomeric element comprises a non-contacting distal radial portion disposed on a radially outwardly facing surface of the second flange portion at a distal end of the second annular rotating screen, the non-contacting distal radial portion comprising a radially outwardly facing surface configured to face and cooperate in use with a radially inwardly facing surface of the sleeve of the washing machine to form a second annular meatus (M1).

12. The sealing device of claim 11, wherein the first elastomeric element and the second elastomeric element are respectively provided with an equal number (N) of annular sealing lips (L1, L2), and wherein the value of (N) is greater than three.

13. The sealing device of claim 12, wherein the number (N) of annular sealing lips (L1, L2) is five.

14. The sealing device of claim 11, wherein the second annular rotating screen is configured to be mounted internally with interference on a motor shaft of a washing machine and axially by the second cylindrical mounting portion against a radially inner ring of the bearing unit of the washing machine.

15. The sealing device of claim 14, wherein, the second cylindrical mounting portion of the second annular rotating screen is configured to face the radially inner ring, and the first elastomeric element is provided with an annular sliding sealing lip, wherein the annular sliding sealing lip cooperates in use with a radially external lateral surface of the second cylindrical mounting portion.

16. The sealing device of claim 1, wherein the first sealing lip (L1) and the second sealing lip (L2) of the plurality of pairs of annular sealing lips (L1, L2) are oppositely inclined, wherein each of the first sealing lip (L1) and the second sealing lip (L2) comprises a radially-inward, angled surface and a radially-outward angled surface, wherein both the radially-inward, angled surface and the radially-outward, angled surface are radially and axially inclined from a respective base of each first sealing lip (L1) and second sealing lip (L2) with respect to an axis of symmetry.

17. The sealing device of claim 16, wherein the first elastomeric element and the second elastomeric element are respectively provided with an equal number (N) of annular sealing lips (L1, L2), and wherein the value of (N) is greater than three.

18. The sealing device of claim 17, wherein the number (N) of annular sealing lips (L1, L2) is five.

19. The sealing device of claim 16, wherein the second annular rotating screen is configured to be mounted internally with interference on a motor shaft of a washing machine and axially by the second cylindrical mounting portion against a radially inner ring of the bearing unit of the washing machine.

20. The sealing device of claim 19, wherein, the second cylindrical mounting portion of the second annular rotating screen is configured to face the radially inner ring, and the first elastomeric element is provided with an annular sliding sealing lip, wherein the annular sliding sealing lip cooperates in use with a radially external lateral surface of the second cylindrical mounting portion.

* * * * *